(12) United States Patent
Allen

(10) Patent No.: US 7,853,404 B2
(45) Date of Patent: Dec. 14, 2010

(54) VEHICLE DOCKING STATION FOR PORTABLE HANDHELD COMPUTING DEVICE

(75) Inventor: David W. Allen, Davisburg, MI (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 0 days.

(21) Appl. No.: 10/115,876

(22) Filed: Apr. 3, 2002

(65) Prior Publication Data

US 2002/0152027 A1 Oct. 17, 2002

Related U.S. Application Data

(60) Provisional application No. 60/281,262, filed on Apr. 3, 2001.

(51) Int. Cl.
*G01C 21/26* (2006.01)

(52) U.S. Cl. .................... 701/213; 455/456.3; 709/217

(58) Field of Classification Search ............... 701/213, 701/211, 207, 202, 205, 33, 208, 36, 212, 701/217; 342/457, 456, 357.13, 358; 455/552, 455/557, 553, 456.3; 340/988, 990; 709/217; *G01C 21/26*
See application file for complete search history.

(56) References Cited

U.S. PATENT DOCUMENTS

| | | | |
|---|---|---|---|
| 4,024,493 A | 5/1977 | Ingels | |
| 4,388,608 A | 6/1983 | Bernard | |
| 4,630,227 A | 12/1986 | Hagenbuch | |
| 4,733,356 A * | 3/1988 | Haeussermann et al. | .... 340/988 |
| 4,831,539 A | 5/1989 | Hagenbuch | |
| 4,884,208 A | 11/1989 | Marinelli et al. | |
| 4,942,529 A | 7/1990 | Avitan et al. | |
| 5,428,546 A | 6/1995 | Shah et al. | |
| 5,438,329 A | 8/1995 | Gastouniotis et al. | |
| 5,479,479 A * | 12/1995 | Braitberg et al. | ......... 455/404.1 |
| 5,493,694 A | 2/1996 | Vicek et al. | |
| 5,523,765 A | 6/1996 | Ichikawa | |
| 5,543,789 A | 8/1996 | Behr et al. | |
| 5,594,650 A | 1/1997 | Shah et al. | |
| 5,598,167 A | 1/1997 | Zijderhand | |
| 5,610,821 A | 3/1997 | Gazis et al. | |
| 5,636,122 A | 6/1997 | Shah et al. | |

(Continued)

FOREIGN PATENT DOCUMENTS

DE 19651146 6/1998

(Continued)

OTHER PUBLICATIONS

International Patent Application PCT/US00/41294, International Search Report (mailed Apr. 3, 2001).

(Continued)

*Primary Examiner*—Tuan C To
(74) *Attorney, Agent, or Firm*—Winston Hsu; Scott Margo

(57) ABSTRACT

A vehicle navigation system includes a base and a handheld device which is portable relative to the base and dockable to the base. The handheld device includes a GPS receiver, display and user input devices and provides limited navigation capability when detached from the base. The base includes additional databases and navigation sensors which provide a full function navigation system when the handheld device is docked to the base station, including turn-by-turn navigation.

11 Claims, 3 Drawing Sheets

U.S. PATENT DOCUMENTS

| | | | |
|---|---|---|---|
| 5,638,077 | A | 6/1997 | Martin |
| 5,699,255 | A | 12/1997 | Ellis et al. |
| 5,742,509 | A | 4/1998 | Goldberg et al. |
| 5,751,245 | A | 5/1998 | Janky et al. |
| 5,758,313 | A | 5/1998 | Shah et al. |
| 5,760,742 | A | 6/1998 | Branch et al. |
| 5,774,829 | A | 6/1998 | Cisneros et al. |
| 5,794,164 | A * | 8/1998 | Beckert et al. ................ 701/1 |
| 5,802,492 | A | 9/1998 | DeLorme et al. |
| 5,816,554 | A | 10/1998 | McCracken |
| 5,819,227 | A * | 10/1998 | Obuchi ........................ 705/1 |
| 5,822,712 | A | 10/1998 | Olsson |
| 5,850,187 | A * | 12/1998 | Carrender et al. ...... 340/825.54 |
| 5,887,269 | A * | 3/1999 | Brunts et al. ................ 701/208 |
| 5,889,337 | A | 3/1999 | Ito et al. |
| 5,889,493 | A * | 3/1999 | Endo ..................... 342/357.08 |
| 5,902,351 | A | 5/1999 | Streit et al. |
| 5,904,727 | A | 5/1999 | Prabhakaran |
| 5,917,435 | A | 6/1999 | Kamiya et al. |
| 5,922,040 | A | 7/1999 | Prabhakaran |
| 5,938,721 | A * | 8/1999 | Dussell et al. .............. 701/211 |
| 5,945,919 | A | 8/1999 | Trask |
| 5,948,043 | A | 9/1999 | Mathis |
| 5,949,345 | A * | 9/1999 | Beckert et al. .......... 340/815.41 |
| 6,002,374 | A | 12/1999 | Nicholas |
| 6,009,363 | A | 12/1999 | Beckert et al. |
| 6,020,654 | A | 2/2000 | Chutorash |
| 6,081,724 | A * | 6/2000 | Wilson ....................... 455/462 |
| 6,091,956 | A | 7/2000 | Hollenberg |
| 6,094,164 | A | 7/2000 | Murphy |
| 6,107,944 | A | 8/2000 | Behr et al. |
| 6,121,924 | A | 9/2000 | Meek et al. |
| 6,125,326 | A * | 9/2000 | Ohmura et al. ............. 701/213 |
| 6,127,945 | A * | 10/2000 | Mura-Smith ................ 340/988 |
| 6,131,051 | A * | 10/2000 | Beckert et al. ................ 700/83 |
| 6,144,114 | A | 11/2000 | Chutorash |
| 6,147,596 | A | 11/2000 | Tsuchiya et al. |
| 6,182,006 | B1 | 1/2001 | Meek |
| 6,188,939 | B1 | 2/2001 | Morgan et al. |
| 6,192,312 | B1 | 2/2001 | Hummelsheim |
| 6,192,314 | B1 | 2/2001 | Khavakh et al. |
| 6,202,008 | B1 | 3/2001 | Beckert et al. |
| 6,246,935 | B1 * | 6/2001 | Buckley ....................... 701/36 |
| 6,249,767 | B1 * | 6/2001 | Okayama et al. ............... 705/5 |
| 6,278,402 | B1 * | 8/2001 | Pippin ................... 342/357.08 |
| 6,311,126 | B1 | 10/2001 | Katayama et al. |
| 6,320,518 | B2 | 11/2001 | Saeki et al. |
| 6,320,535 | B1 * | 11/2001 | Hillman et al. .......... 342/357.1 |
| 6,321,091 | B1 | 11/2001 | Holland |
| 6,334,061 | B1 * | 12/2001 | Cunningham et al. .... 455/553.1 |
| 6,334,089 | B2 * | 12/2001 | Hessing ...................... 701/209 |
| 6,339,745 | B1 | 1/2002 | Novik |
| 6,347,278 | B2 | 2/2002 | Ito |
| 6,349,246 | B1 * | 2/2002 | Smith et al. ..................... 701/1 |
| 6,356,824 | B1 | 3/2002 | Chene et al. |
| 6,356,836 | B1 | 3/2002 | Adolph |
| 6,374,182 | B2 * | 4/2002 | Bechtolsheim et al. ...... 701/209 |
| 6,401,027 | B1 | 6/2002 | Xu et al. |
| 6,421,606 | B1 * | 7/2002 | Asai et al. ................... 701/209 |
| 6,449,157 | B1 | 9/2002 | Chu |
| 6,525,768 | B2 * | 2/2003 | Obradovich ........... 348/231.99 |
| 6,596,374 | B1 | 7/2003 | Adjeleian |
| 6,597,983 | B2 | 7/2003 | Hancock |
| 6,618,241 | B2 | 9/2003 | Bang |
| 6,622,083 | B1 * | 9/2003 | Knockeart et al. .......... 701/202 |
| 6,675,092 | B1 | 1/2004 | Katayama et al. |
| 6,915,206 | B2 * | 7/2005 | Sasajima .................... 701/208 |
| 7,057,889 | B2 | 6/2006 | Mata et al. |
| 7,088,574 | B2 | 8/2006 | Greenidge et al. |
| 7,142,979 | B1 * | 11/2006 | Shonk ........................ 701/208 |
| 7,177,651 | B1 | 2/2007 | Almassy |
| 7,295,921 | B2 | 11/2007 | Spencer et al. |
| 2001/0021894 | A1 * | 9/2001 | Sakamoto et al. ........... 701/209 |
| 2001/0035683 | A1 * | 11/2001 | Yearwood et al. .......... 307/10.1 |
| 2001/0038346 | A1 * | 11/2001 | Learman et al. ............. 340/988 |
| 2001/0047240 | A1 * | 11/2001 | Lee ............................ 701/208 |
| 2002/0004704 | A1 * | 1/2002 | Nagatsuma et al. ......... 701/213 |
| 2002/0177948 | A1 | 11/2002 | Upparapalli |
| 2005/0151367 | A1 | 7/2005 | Packard et al. |
| 2006/0287811 | A1 * | 12/2006 | Rentel ........................ 701/200 |
| 2007/0277713 | A1 | 12/2007 | Miresmaili |
| 2008/0027644 | A1 | 1/2008 | Spencer |
| 2009/0170525 | A1 | 7/2009 | Baghdasaryan |

FOREIGN PATENT DOCUMENTS

| | | |
|---|---|---|
| DE | 198 48 192 A1 | 4/2000 |
| DE | 19848192 | 4/2000 |
| DE | 19848192 A1 | 4/2000 |
| DE | 19930796 | 1/2001 |
| DE | 60130759 | 7/2008 |
| EP | 0816804 | 1/1998 |
| EP | 0816804 A1 | 1/1998 |
| EP | 1005006 | 5/2000 |
| EP | 1005006 A2 | 5/2000 |
| EP | 1 063 494 A1 | 12/2000 |
| EP | 1063494 A1 | 12/2000 |
| EP | 1106965 | 6/2001 |
| EP | 1147374 | 10/2001 |
| EP | 0745959 | 8/2003 |
| EP | 1241651 | 2/2005 |
| EP | 1292934 | 10/2007 |
| JP | 7253327 | 10/1995 |
| JP | 10213443 | 11/1998 |
| JP | 2004198245 | 7/2004 |
| KR | 20070056227 | 6/2007 |
| WO | 0034932 | 6/2000 |
| WO | 0113069 | 2/2001 |
| WO | 0129514 | 4/2001 |
| WO | WO 01/29514 | 4/2001 |
| WO | 0199082 | 12/2001 |
| WO | 02100121 | 12/2002 |

OTHER PUBLICATIONS

International Patent Application PCT/US01/19566, International Search Report (mailed Apr. 25, 2002).

International Patent Application PCT/US01/19566, Written Opinion (mailed Oct. 21, 2002).

International Patent Application PCT/US02,10520, International Search Report (mailed Aug. 19, 2002).

Transaction History of U.S. Appl. No. 09/598,538, filed Jun. 21, 2000, entitled "Method of Triggering the Transmission of Data from a Mobile Asset," now U.S. Patent Serial No. 7,142,979.

Transaction History of U.S. Appl. No. 09/692,295, filed Oct. 29, 2000, entitled "Portable Vehicle Navigation System," now abandoned.

Transaction History of U.S. Appl. No. 10/096,365, filed Mar. 12, 2002, entitled "Off-Board Navigation System With Personalized Navigation Database."

Transaction History of U.S. Appl. No. 10/606,277, filed Jun. 23, 2003, entitled "Mounting Apparatus for Electronic Devices," now U.S. Patent Serial No. 7,088,574.

Transaction History of U.S. Appl. No. 10/812,027, filed Mar. 30, 2004, entitled "Portable Vehicle Navigation System," now U.S. Patent Serial No. 7,295,921.

Transaction History of U.S. Appl. No. 11/855,129, filed Sep. 13, 2007, entitled "Portable Vehicle Navigation System."

Transaction History of U.S. Appl. No. 11/965,356, filed Dec. 27, 2007, entitled "Attaching Location Data to a SMS Message."

International Patent Application No. PCT/US2008/088137, Written Opinion and International Search Report, May 29, 2009.

* cited by examiner

VEHICLE DOCKING STATION FOR PORTABLE HANDHELD COMPUTING DEVICE

This application claims priority to provisional application U.S. Ser. No. 60/281,262 filed Apr. 3, 2001.

BACKGROUND OF THE INVENTION

The present invention relates generally to navigation systems and more particularly to a navigation system having a base station permanently mounted in the car and a handheld device which is portable relative to the base station and provides a subset of functionality apart from the base station.

Vehicle navigation systems with full functionality, including a full road database and turn-by-turn instructions, etc., are typically installed in a vehicle. Another known navigation system, developed by the assignee of the present invention, is "portable" in that it can be transferred from vehicle to vehicle, but are not really practical to be carried by a user. The known in-vehicle navigation systems are not sufficiently portable to be carried by a hiker. The known navigation systems include user input and output devices for communicating with the user, navigation sensors, such as a GPS receiver, accelerometer, gyros, vehicle speed sensor and other sensors. The navigation system further includes a database of roads and destinations and software for calculating routes from the present position of the vehicle to selected destinations in the database.

Handheld GPS receivers comprising a display, input buttons and GPS receiver are also known. These handheld devices are often used for hiking, boating or similar activities, but are insufficient for performing turn-by-turn instructions in a vehicle.

SUMMARY OF THE INVENTION

The present invention provides a vehicle navigation system with full functionality, including extended navigation sensors, a full navigation database, turn-by-turn instructions, etc. The vehicle navigation system includes a dockable handheld unit with a display and input devices, a limited database and memory and a GPS receiver.

While the handheld device is docked on the base, the navigation system indicates turn-by-turn instructions and operates menus on the display on the handheld device and receives input on the input devices on the handheld device. The navigation system also receives GPS signals from the GPS receiver on the handheld device, preferably as assisted by an antenna in the base.

When the handheld device is removed from the base, the handheld device operates on a rechargeable battery. A CPU and memory calculate the current position of the handheld device based upon signals from the GPS receiver relative to a limited database of roads, terrain or waterway stored on the handheld device. The handheld device may further include communication circuitry, such as cell phone circuitry for providing wireless communication.

Thus, the vehicle navigation system of the present invention provides both full featured in-vehicle navigation together with a portable handheld device with limited positioning and navigation capabilities. Further, the handheld device could integrate other features, such as personal digital assistant features, such as contact lists with addresses which could be downloaded to the base or selected as destinations for the calculation of routes by the navigation system, and telephone numbers which could be dialed by the communication circuitry on the handheld device.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
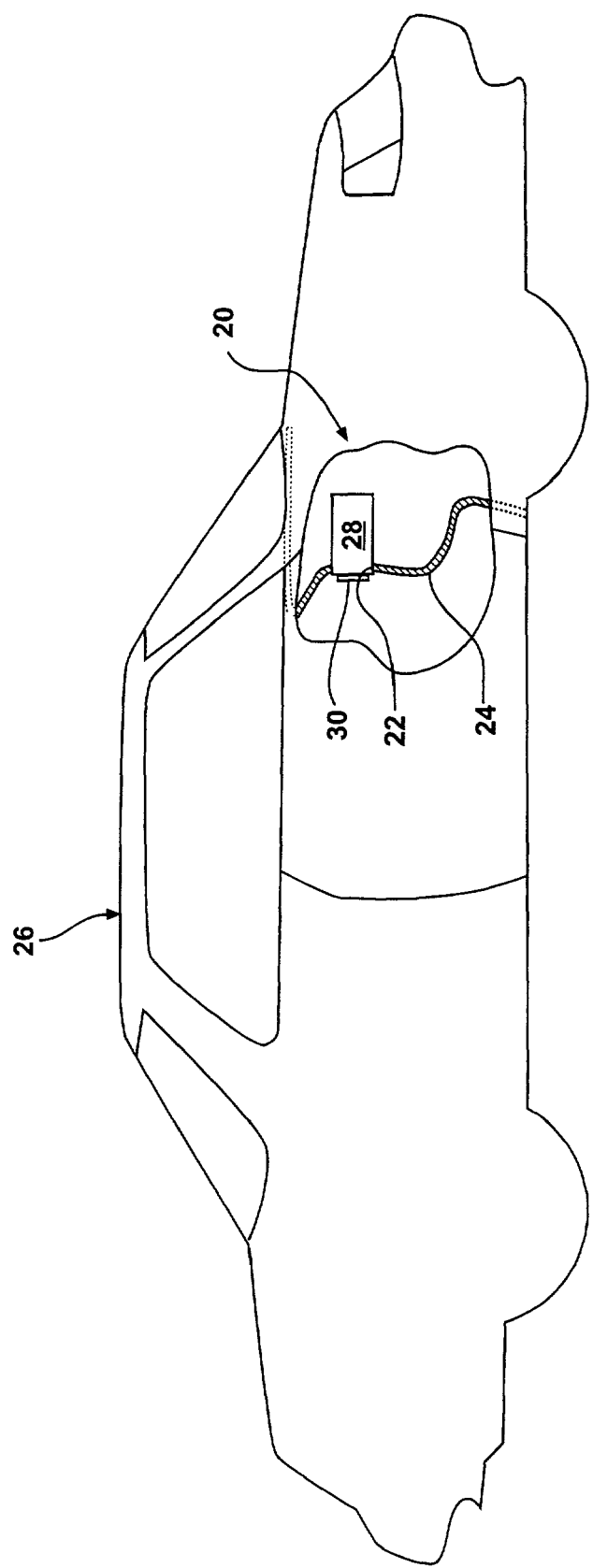
FIG. 1 is a schematic of the navigation system of the present invention installed in a vehicle.

The navigation system 20 of the present invention is shown schematically in FIG. 1 installed in a vehicle's standard radio DIN slot 22 in a dashboard 24 of a vehicle 26. The vehicle navigation system 20 includes a base 28 installed in the DIN slot 22 and a handheld device 30 removably docked to the base 28.

Figure 2:
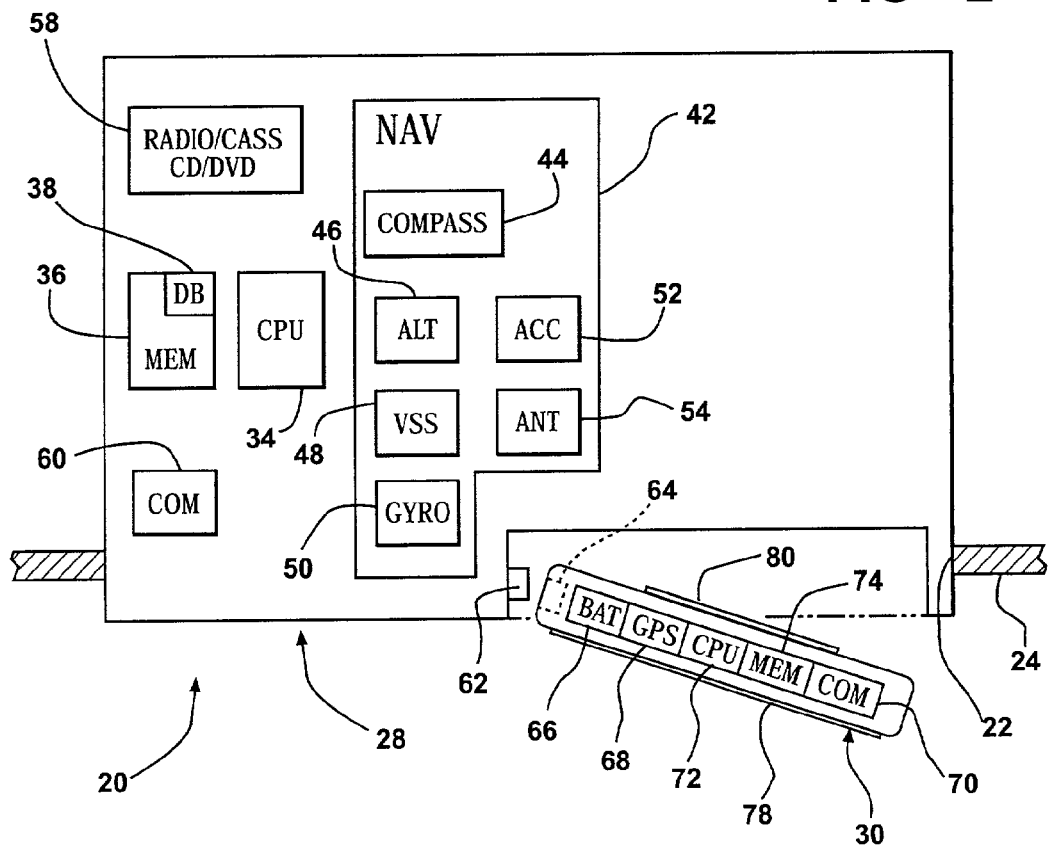
FIG. 2 is a plan view of the vehicle interface device described by the first embodiment.

FIG. 2 is a plan view of the vehicle navigation system 20. The base 28 includes a CPU 34 connected to memory or storage 36, such as a hard drive, CD-rom, DVD, RAM, ROM or other optically readable magnetic storage or integrated circuit. The memory 36 includes a database 38 including a map of all the roads in the area to be traveled by the vehicle 26. The software for the CPU 34 including the route guidance, operating system, position determining software, etc. may also be stored in memory 36. The base 28 also includes a navigation sensor suite 42 including one or more of a compass 44, altimeter 46, vehicle speed sensor 48, gyro 50, multi-access orthogonal accelerometer 52 and GPS antenna 54. The base 28 further includes the typical in-dash systems, such as a radio/cassette/CD/DVD player 58. The base 28 may further include communication circuitry 60 such as cell phone, GSM, etc. The base 28 further includes a connector 62 for connecting to a handheld unit 30.

Figure 3:
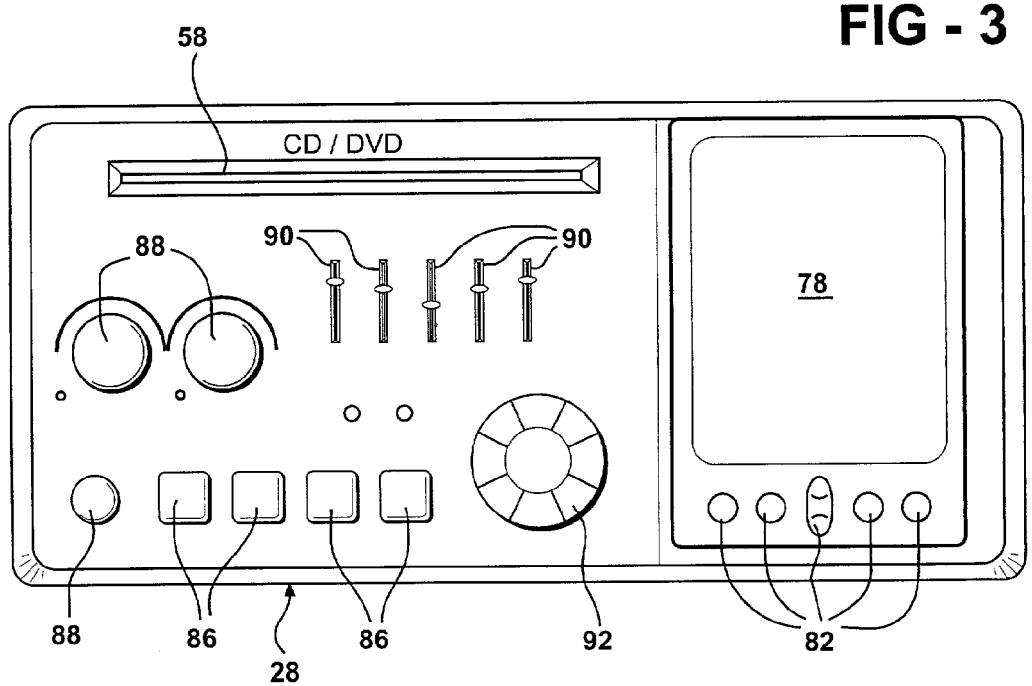
FIG. 3 is a front view of the vehicle interface device of the first embodiment.

The handheld unit 30 includes a connector 64 for connecting the handheld unit 30 to the connector 62 of the base 28. The handheld unit 30 further includes a rechargeable battery 66 which is recharged whenever the handheld unit is docked to the base 28. The handheld unit further includes a GPS receiver 68 and may include communication circuitry 70, such as cell phone, GSM, etc. The handheld unit 30 further includes a CPU 72 for performing the functions described herein and memory 74 for storing all necessary data, databases and software. The handheld unit 30 further includes input and output devices, such as a display 78 and speaker 80. Additional input devices 82 are shown in FIG. 3 as several buttons are operable by the user. As can be seen further in FIG. 3, the base 28 includes additional input devices, such as buttons 86, knobs 88, sliding controls 90, and joystick 92.

The CPUs 34, 72 are suitably programmed (in memory 36/74) to perform all of the functions described herein. One of ordinary skill in the art would be able to provide such suitable programming.

In operation, when the handheld device 30 is docked to the base 28, the navigation system 20 is a full featured navigation system. The GPS receiver 68 as assisted by the GPS antenna 54 and the base 28 provides the position signals to the CPU 34. Based upon on this together with the other navigation sensors in the navigation sensor suite 42, the CPU determines the present position of the navigation system 20 relative to the database 38 of roads stored in memory 36. The display 78 of the handheld device 30 is also used by the base 28 for displaying menus and other information during operation of the entertainment systems, such as the radio/cassette/cd/dvd player 58.

Preferably, the handheld device also provide personal digital assistant features, such as storing contact lists including addresses and telephone numbers. The addresses from the handheld device 30 can be downloaded to the memory 36 of the base 28. These addresses can then be chosen in the navigation system 20 utilizing input devices 82. The navigation system 20 then calculates a route to the chosen destination in a known manner and displays turn-by-turn instructions on display 78. In this manner, the selection of destinations in the database 38 of the navigation system 20 is facilitated.

Handheld device 30 is removable from the base station 28 and provides limited functionality without the base station 28. The CPU 72 can calculate the position of the handheld device utilizing the GPS receiver 68. The handheld device 30 also provide limited navigation, including waypoint navigation, utilizing the display 78 and a limited database in memory 74. The handheld device 30 is also operable as a cell phone and PDA when apart from the base 28.

The navigation system 20 of the present invention provides a full-featured vehicle navigation system 20 when the handheld device 30 is docked, a limited functionality portable handheld device 30 with navigation, PDA and cell phone features, and an entertainment system with a display 78 shared with the navigation system 20. The navigation system 20 can be installed into an existing DIN slot 22 on a vehicle 22 dashboard 24, thus facilitating installation.

Figure 4:
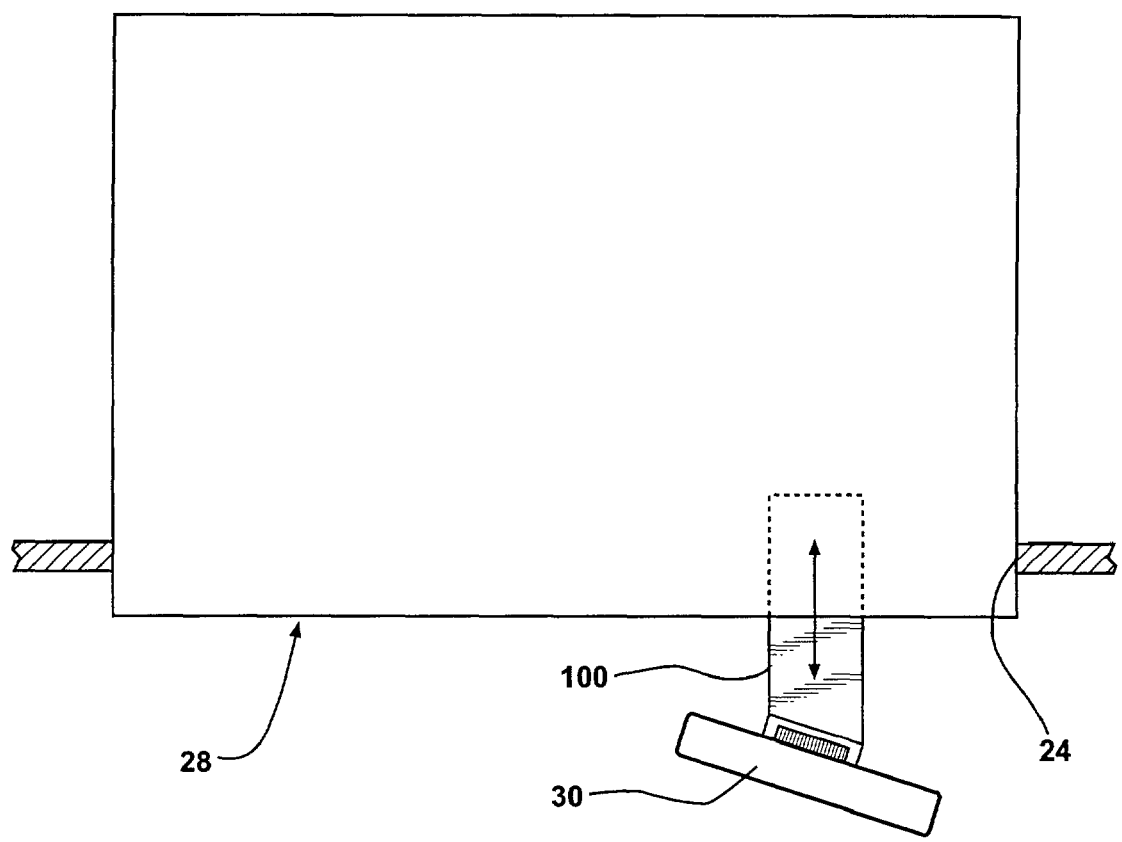
FIG. 4 is a plan view of showing of a navigation system with an alternate docking connection.

FIG. 4 shows the navigation system of the present invention with an alternate connector 100 that is retractable and extendable forward from the base 28 for connecting to the handheld device 30.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. As is known, the database could be provided remotely from the vehicle via wireless communication. The GPS receiver could be replaced by other known position-determining systems, such as those used with cell phone technology or other triangulating systems.

The invention claimed is:

1. A navigation system comprising:
a base including a navigation unit, a first processor, and a first memory to store a map database, wherein the navigation unit includes one or more navigation sensors; and
a portable unit including a second processor, a second memory, a position determining unit, and a display wherein said portable unit is configured to determine and forward position data to said base when said portable unit is communicatively coupled to said base, the position data comprising information indicating a real-time location of the portable unit;
wherein said base is configured to receive said position data from said portable unit, generate processed data via the first processor, and forward said processed data to said display when said base and said portable unit are communicatively coupled; and
wherein said processed data is to be generated by the base using (i) said position data, (ii) data from said map database, and (iii) data from the one or more navigation sensors.

2. The navigation system of claim 1, wherein said navigation unit comprises at least one of:
a compass;
an altimeter;
a vehicle speed sensor;
a gyro;
a positioning system antenna configured to communicatively couple with the portable unit; and
an accelerometer.

3. The navigation system of claim 1, wherein said position determining unit comprises a GPS (Global Positioning System) unit.

4. The navigation system of claim 1, wherein said portable unit and said base are communicatively coupled through a wired connection.

5. The navigation system of claim 1, wherein said portable unit and said base are communicatively coupled through a wireless connection.

6. The navigation system of claim 1, wherein said display displays a map indicating the current position data of said base based on said position data.

7. The navigation system of claim 1, wherein said portable unit is configured to operate as a PDA (Personal Digital Assistant).

8. The navigation system of claim 1, wherein said portable unit is configured to operate as a cellular telephone.

9. The navigation system of claim 1, wherein said second memory is to store a map database, said map database stored in said first memory being larger than said map database stored in said second memory.

10. The navigation system of claim 1, wherein said portable unit is configured to operate independently of said base when said portable unit is not communicatively coupled to said base.

11. The navigation system of claim 1, wherein said base is adapted to be installed in a DIN (Deutsche Industry Normen) slot in a vehicle.

* * * * *